US006381273B1

(12) United States Patent
Law et al.

(10) Patent No.: US 6,381,273 B1
(45) Date of Patent: Apr. 30, 2002

(54) METHOD FOR DATA TYPE CASTING AND ALGEBRAIC MANIPULATION IN A SCENE DESCRIPTION OF AUDIO-VISUAL OBJECTS

(75) Inventors: Chee Yong Law; Thiow Keng Tan, both of Singapore (SG)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/413,366

(22) Filed: Oct. 6, 1999

(30) Foreign Application Priority Data

Oct. 9, 1998 (JP) .......................... 10-287663

(51) Int. Cl.$^7$ ............................. H04B 1/66
(52) U.S. Cl. ..................................... 375/240
(58) Field of Search ............... 375/240, 240.01, 375/240.02, 240.03, 240.04, 240.5, 240.15, 240.16, 240.17; 345/302, 339, 421, 440, 149, 474; 707/501; 714/38; 348/143; 382/103, 224, 104, 160, 107, 240; H04B 1/66

(56) References Cited

U.S. PATENT DOCUMENTS

| | | | | | |
|---|---|---|---|---|---|
| 5,969,755 | A | * | 10/1999 | Courtney | 348/143 |
| 6,130,670 | A | * | 10/2000 | Porter | 345/421 |
| 6,266,053 | B1 | * | 7/2001 | French et al. | 345/302 |
| 6,272,650 | B1 | * | 7/2001 | Meyer et al. | 714/38 |
| 6,295,367 | B1 | * | 9/2001 | Crabtree et al. | 382/103 |
| 6,295,380 | B1 | * | 9/2001 | Takahashi | 382/240 |
| 6,317,131 | B2 | * | 11/2001 | Basso et al. | 345/474 |

OTHER PUBLICATIONS

International Organization for Standardisation ISO/IEC JTC1/SC29/WG11 Document ISO/IEC JTC1/SC29/Wg11 N2201 15, May 1998, entitled "Text for ISO/IEC FCD 14496–1 Systems", from Final Committee Draft of International Standard, Version of May. 18, 1998.

Masini G. et al., entitled "Objected–Oriented Languages", published 1991, from Academic Press, London XP002133393.

"International Standard ISO/IEC 14772–1: 1997 Virtual Reality Modeling Language (VRML97)", from www.vrml.org/Specifications/VRML97.

Signes, J., et al., entitled "MPEG–4's Binary Format for Scene Description", from http://drogo.cselt.stet.it/ufv/leonardo/icjfiles/mpeg–4$_{13}$ si/5–BIFS$_{13}$ paper/5–BIFS$_{13}$ paper.htm, published Jan. 11, 2000.

* cited by examiner

*Primary Examiner*—Chris Kelley
*Assistant Examiner*—Tung Vo
(74) *Attorney, Agent, or Firm*—Greenblum & Bernstein, P.L.C.

(57) ABSTRACT

A method for type casting data of different data types between two BIFS nodes. The method provides a simple, intuitive and easy method of creating a dynamic scene description that provides interactivity with the environment. This method removes the constant output constraint of the valuator defined in the MPEG-4 System Final Committee Draft dated May 15, 1998 (document ISO/IEC JTC1/SC29/WG11 N2201). The various conversion methods are disclosed for different data types as defined in the MPEG-4 System Final Committee Draft. The conversion methods are designed to be logical and to provide maximum usability in this enhanced version of the valuator node.

12 Claims, 5 Drawing Sheets

МЕТHOD FOR DATA TYPE CASTING AND ALGEBRAIC MANIPULATION IN A SCENE DESCRIPTION OF AUDIO-VISUAL OBJECTS

BACKGROUND OF THE INVENTION

1. Field of the Invention

The invention is related to the representation of the spatial and temporal information of an audio-visual scene. In object-based compression of a scene, where the individual objects that form the complete scene are compressed separately, a means of representing the spatial and temporal relationship of the objects is necessary. In a typical scene, it is possible that the properties of one object are used to affect the properties of another. This invention is essential for representing and recreating a scene by facilitating exchanges of properties between two objects.

2. Description of the Related Art

MPEG-4 [1] specifies an object-based compression of digital audio-visual information. It allows object-based interactivity of multimedia content by delineating the audio-visual objects of the scene and separately compressing each of them. The compressed audio-visual data is augmented with a scene description that is used by the decoder to reconstruct the scene by compositing the individual audio-visual objects at the decoder. In MPEG-4, the scene description is referred to as binary format for scene description (BIFS).

The scene description data is in the form of a scene tree made up of nodes and routes as shown in FIG. 1. An audio-visual object is represented by a collection of nodes. Nodes contain information or properties of the object. Routes are used to link the properties of the nodes such that the properties of one object can be used to affect the properties of another object.

According to the prior art, some form of data type casting is essential to the usefulness and success of the BIFS. This is because by definition the values at the two ends of a route must be of the same data type. Currently, the valuator can be used for this purpose, as shown in FIG. 2. Data from field 1 of node 1 is routed through the valuator node to field 1 of node 2. However, due to the static nature of the valuator, the second node will always receive a fixed value regardless of the first node. As such, the value of field 1 of node 2 cannot change in respond to field 1 of node 1. However, this gives rise to other problems which will be discussed in the next section.

In the VRML specification [2], the second prior art, scripting is usually used to provide this data type casting mechanism. However, scripting is more complex and requires that the users learn the scripting language. Furthermore, implementation of a scripting node requires an interpreter that has much higher resource requirements.

In the Systems Final Committee Draft (document ISO/IEC JTC1/SC29/WG11 N2201) [1], the valuator node is defined for allowing output values of a node to be routed to an input value of another node of different data type. For example, an output value of data type Boolean (TRUE/FALSE) can be connected to an input value of floating-point data type by using the valuator node. However, the MPEG System Committee Draft defines the output of the valuator node to be a constant, this severely limits the use of the valuator node for type casting purposes resulting in extreme difficulties in creating a more complex scene. In fact, many valuator nodes and work-around are required to implement even simple scenes.

The current prior art have the following deficiencies:

(1) The data type of the property that is being connected from one node to another node through the route must be the same.

(2) Type casting can only be performed by a specific node called the valuator node.

(3) The output of the valuator node is always a constant.

This creates several problems especially when we would like the property of one node to influence the property of another node when the properties have different data types.

First, since route has no capability of changing the data type of the properties, properties of different data types cannot be connected. The trivial solution of course is to allow routes to handle data type casting. However, this would add additional complexity to the implementation of routes, as in the majority of cases, no data type casting is necessary.

Therefore, the valuator node is necessary in order to perform the data type casting function. However, the valuator has another limitation. Its output is a constant and cannot change. Therefore, in order for the property of one node to influence the property of another node, multiple valuators are needed.

With the limitations highlighted above, it is not possible to route from the same field of nodes through two valuators, each having different constant values, as illustrated in FIG. 3. As the last route will overwrite all information of the previous routes. However, this situation is actually quite common. In this prior art, an attempt is made to change the input field of Node 1, 308, depending on the output field of Node 1, 301. The output field of Node 1 is connected to the valuator 1, 304, via the route, 302. The output of the Valuator 1 is then connected to the input field of Node 2 via route, 306. Similarly, the same output of Node 1 is also connected to valuator 2, 305, via the route, 303. The output of the valuator 2 is then connected to the input field of Node 2 via route, 307. However this does not create the desired result because the second route, 307, will always overwrite the value of the first route, 306.

The conclusion is that it is not possible to have value of input property of node 2 to dependent on output property of node 1 if they are of different data types. A means to overcome this is essential as many situation requires such type casting functionality such as a 2-state button (refer to example 1 for illustration).

SUMMARY OF THE INVENTION

Our solution to the problem is to extend and enhance the functionality of the valuator node specified in the MPEG-4 System Committee Draft by removing the constraint that the output values of the valuator node be a constant. Instead, the output values should be a function of the input values. This is illustrated in FIG. 4. The field of the Node 1, 401, is connected to the input field of the valuator node, 403, via the route, 402. The valuator node then converts the input field to the output field by a conversion routine followed by a data type casting routine. The output field is then connected to the input field of Node 2, 405, via the route, 404.

By this, we eliminate the need for multiple valuator nodes to be connected to the same destination field.

A detailed block diagram of the invention is shown in FIG. 5. To illustrate this invention, a simple linear function of the form shown below is proposed.

$$f(x) = \text{factor} * x + \text{offset} \qquad (1)$$

Where
factor=user specified values, one of the exposedField factor values shown in the semantic tables for the valuator below offset=a constant value, one of the exposedField offset values shown in the semantic tables for the valuator below.

The Factor parameter allows scaling of the input values. For example, an integer value can be scaled to a value between 0 and 1 of a floating-point value by specifying $2^{32}$ as the factor.

The offset parameter introduces an offset to the input value. This can be used to perform a delay to a certain action when used with a TimeSensor node. This value is the same as that specified in the original valuator node. Note that this is an extension to the original valuator node as most of the original functionality is preserved by setting the value of factor to be zero and offset to the required output value. This will make this new version of the valuator acts like the currently specified valuator node.

According to the first aspect of the present invention, a method for linking information of different data types in a representation of the spatial and temporal description of a scene where the spatial and temporal relationship of the objects in the scene are represented by a scene tree description comprising of a plurality of nodes which describe the properties of the object and routes which connect the fields of one node to another, by means of a valuator node comprising the steps of setting the value of the input of the valuator node to the value of output of the source node;

determining the data type of the output of the source node and the input of the destination node;

selecting the operation and typecasting necessary from a set of predefined procedure or function based on the data type of said fields;

modifying said input by said selected procedure or function to form the output of the valuator node;

casting said output of the valuator node to the required data type of the input of the destination node, and setting the value of the input of the destination node to the value of the output of the valuator node.

According to the second aspect, a method of linking information of different data types in a representation of the spatial and temporal description of a scene as in the first aspect, where the input and output fields of the valuator comprises of one of but no limited to the following data types: integer number, floating point number or Boolean value.

According the third aspect, a method of linking information of different data types in a representation of the spatial and temporal description of a scene as in the first aspect, where the method of modifying said input value by a predefined procedure or function to form the output value comprises the steps of multiplying the input field by a constant value followed by adding a second constant value to obtain the final value for the output field.

According to the fourth aspect of the invention, a method for linking information of different data types in a representation of the spatial and temporal description of a scene where the spatial and temporal relationship of the objects in the scene are represented by a scene tree description comprising of a plurality of nodes which describe the properties of the object and routes which connect the fields of one node to another, by means of a valuator node comprising the steps of setting the value of the input vector of the valuator node to the value of the fields of output vector of the source node;

determining the data type of the fields of the output vector of the source node and the input vector of the destination node;

selecting the operation and typecasting necessary from a set of predefined procedure or function based on the data type of said fields;

modifying said input vector by said selected procedure or function to form the output vector of the valuator node;

casting said output vector of the valuator node to the required data type of the input vector of the destination node, and setting the value of the input vector of the destination node to the value of the output vector of the valuator node.

According to the fifth aspect, a method of linking information of different data types in a representation of the spatial and temporal description of a scene as in the first aspect, where the input and output vectors contain a plurality of elements and that the elements comprises of one of but no limited to the following data types: integer number, floating point number or Boolean value.

According to the sixth aspect, a method of linking information of different data types in a representation of the spatial and temporal description of a scene as in the fourth aspect, where the method of modifying said input vector by a predefined procedure or function to form the output vector comprises the steps of multiplying each element of input vector by a constant value to obtained the scaled value; and adding a second constant value to the scaled value to obtain the offset value; and setting each element of the output vector to the corresponding offset value.

According to the seventh aspect, a method of linking information of different data types in a representation of the spatial and temporal description of a scene as in the fourth aspect, where the method of modifying said input vector by a predefined procedure or function to form the output vector comprises the steps of multiplying each element of input vector by a constant value to obtained the scaled value;

adding a second constant value to the scaled value to obtain the offset value;

summing all the offset values derived from the input vector to form; and setting each element of the output vector to said sum.

According to the eighth aspect, a method of linking information of different data types in a representation of the spatial and temporal description of a scene as in the fourth, sixth or seventh aspect, where the valuator node comprises an additional input field to control the choice of selecting the output as the output vector of the sixth aspect or the seventh aspect.

According to the ninth aspect, a method of modifying said input vector by a predefined procedure or function to form the output value as in the sixth aspect, where the valuator node comprises an additional input field and that the setting of each element of the output vector to the corresponding offset value is only enabled when a control signal is received by said input field or if said input field is set to a predefined value.

According to the tenth aspect, a method of modifying said input vector by a predefined procedure or function to form the output value as in the sixth aspect, where the valuator node comprises an additional input field and that the setting of each element of the output vector to said sum is only enabled when a control signal is received by said input field or if said input field is set to a predefined value.

According to the eleventh aspect, a method of linking information of different data types in a representation of the spatial and temporal description of a scene as in the first, second, fourth, sixth, seventh or eighth aspect, where the constants are user defined either at the time of content creation or during the execution of the content.

DESCRIPTION OF THE PREFERRED EMBODIMENTS

The invention is mainly used to facilitate information exchange between two nodes. How the information is exchanged is important. It is important that the data type casting operations are carefully defined.

Figure 1:
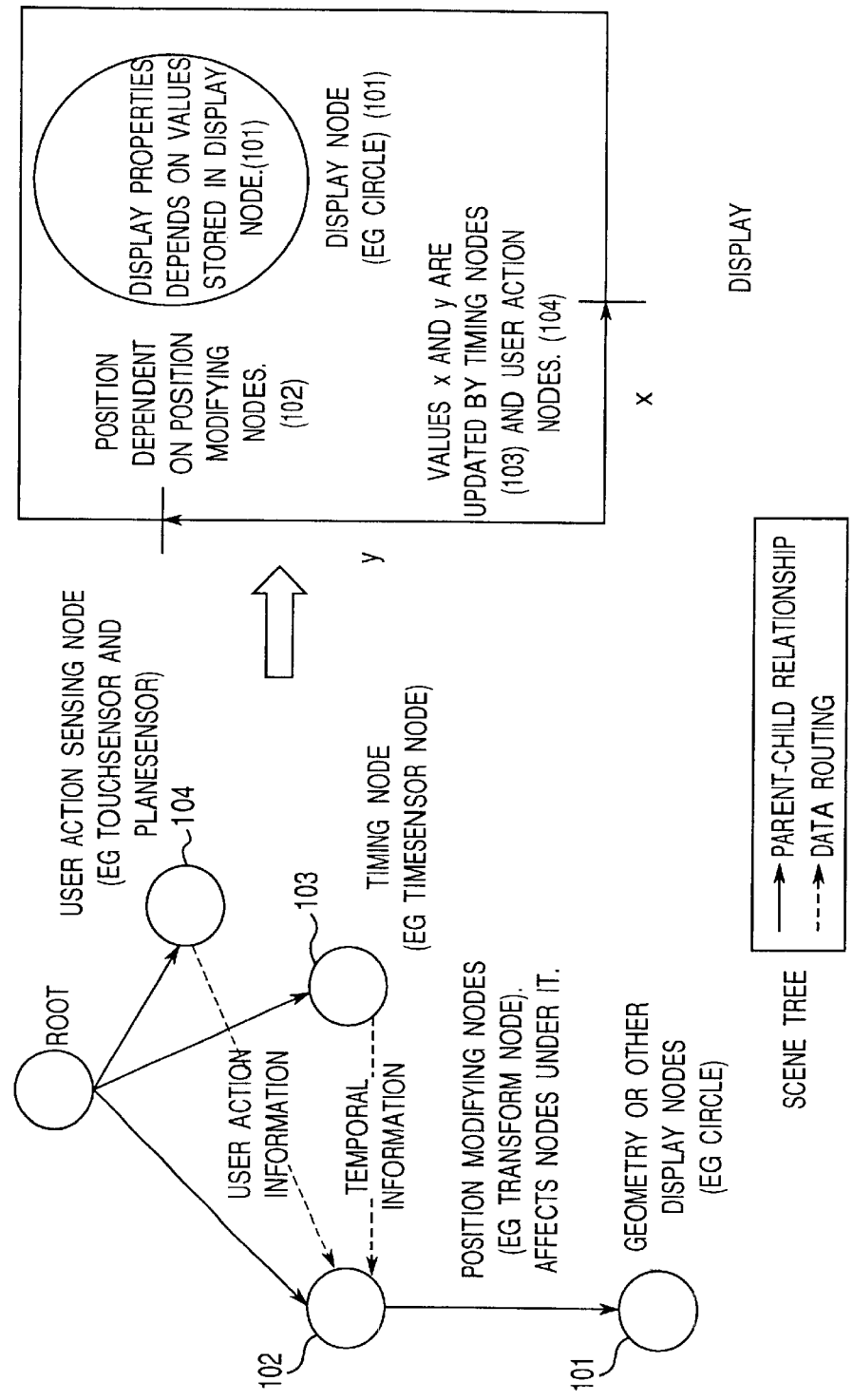
FIG. 1 is a diagram showing the prior art of how the spatial and temporal information of a scene description can be represented by nodes and routes.
Figure 2:
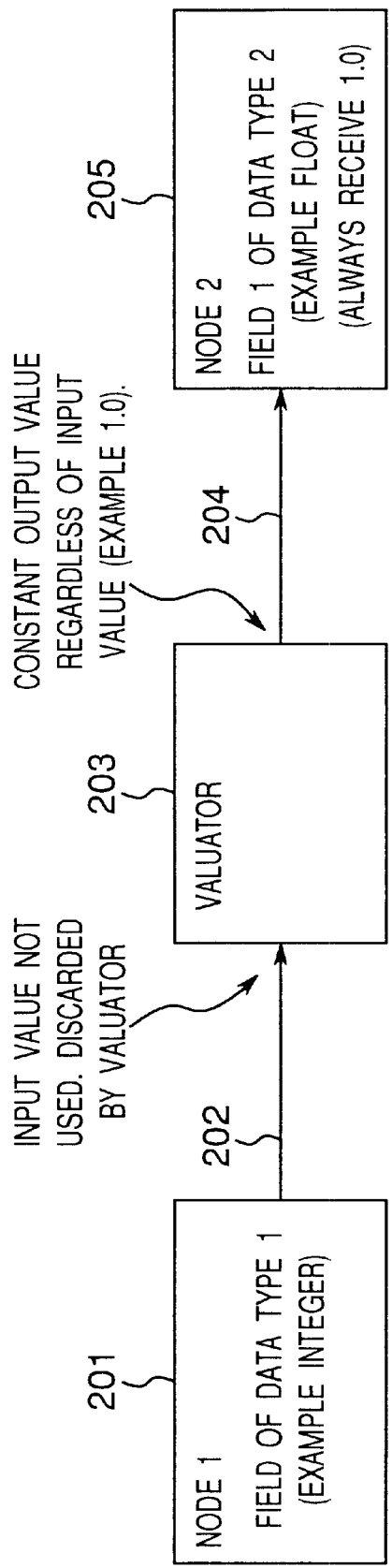
FIG. 2 is a block diagram showing how the valuator node is being used as specified in the current MPEG-4 System Final Committee Draft dated May 15, 1998.
Figure 3:
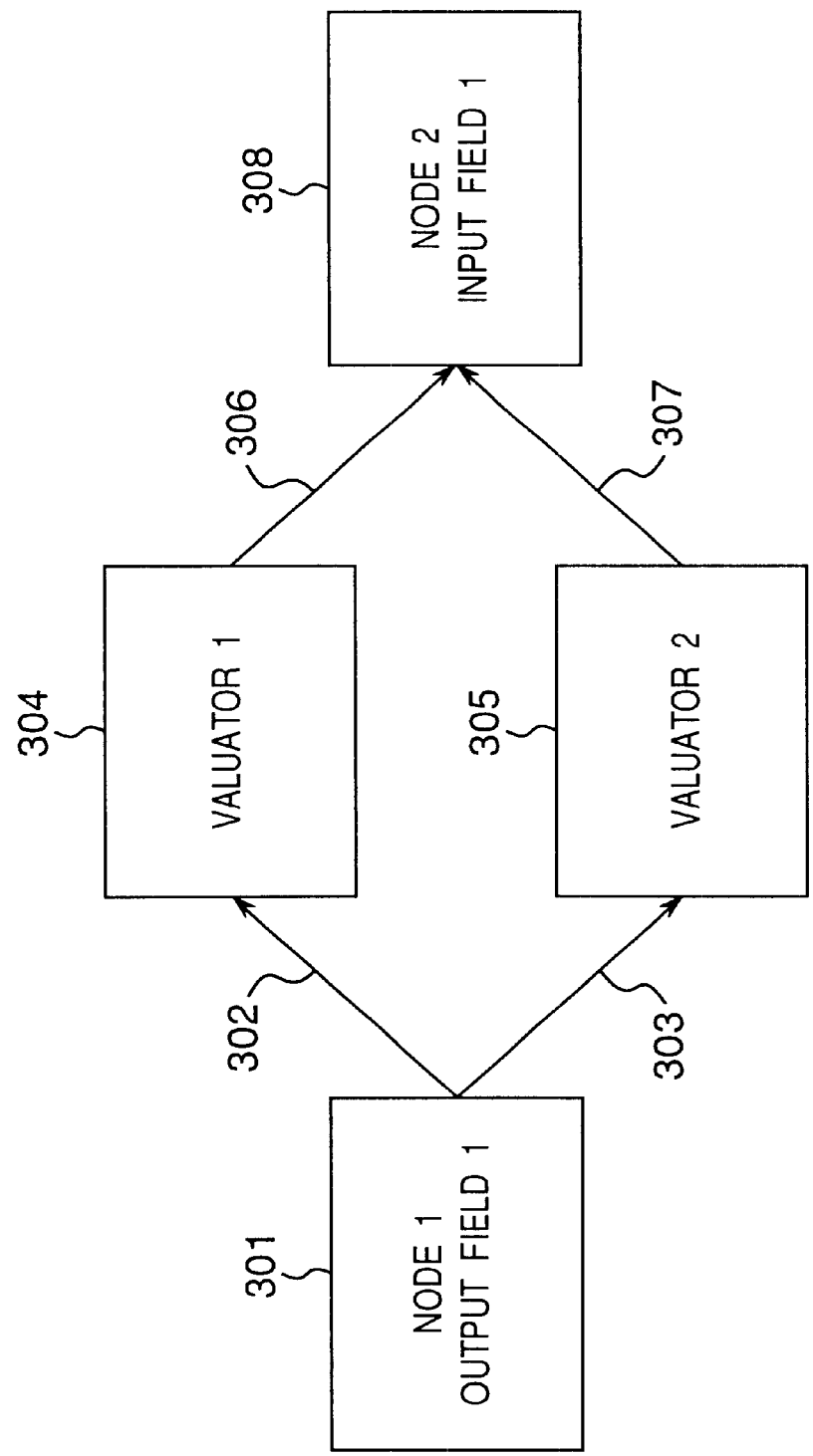
FIG. 3 is a block diagram showing the problem that not more then one route can be routed from the same field of a node to the same field of another node regardless of the number of valuators used.
Figure 4:
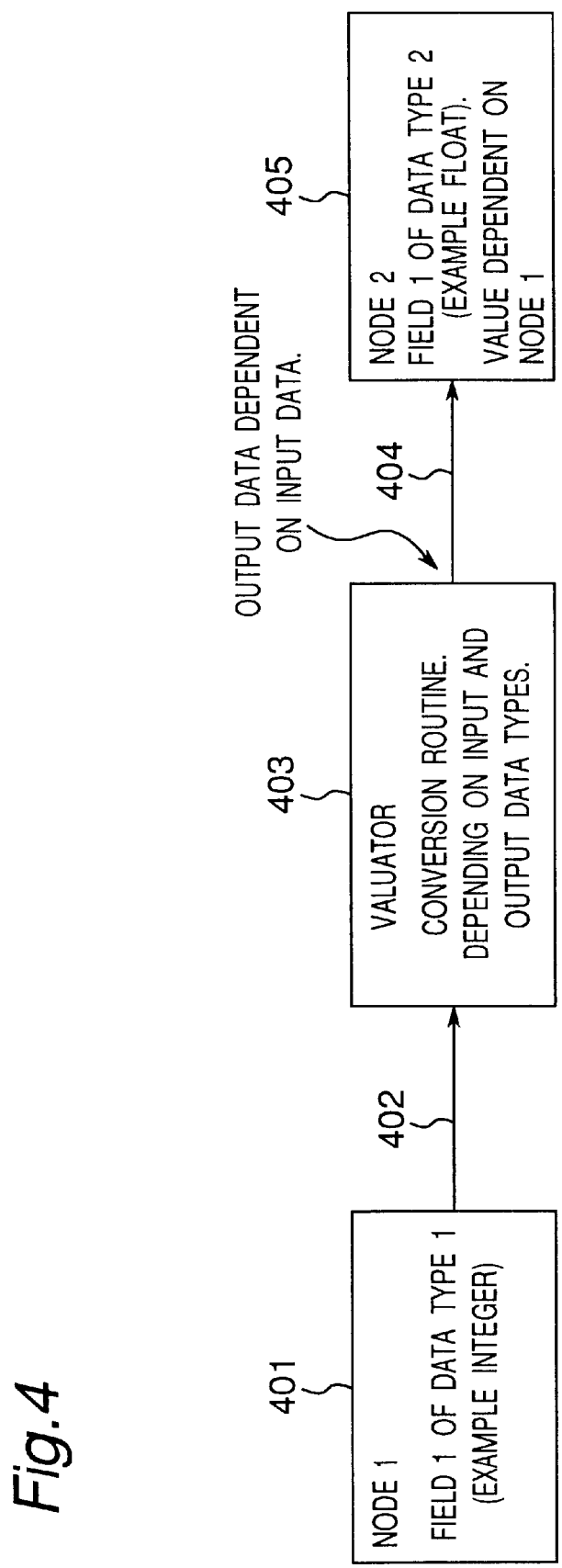
FIG. 4 is a block diagram showing how the valuator node is used to connect between two other nodes where the output and input fields are of different data types, in which the connections are made by routes.
Figure 5:
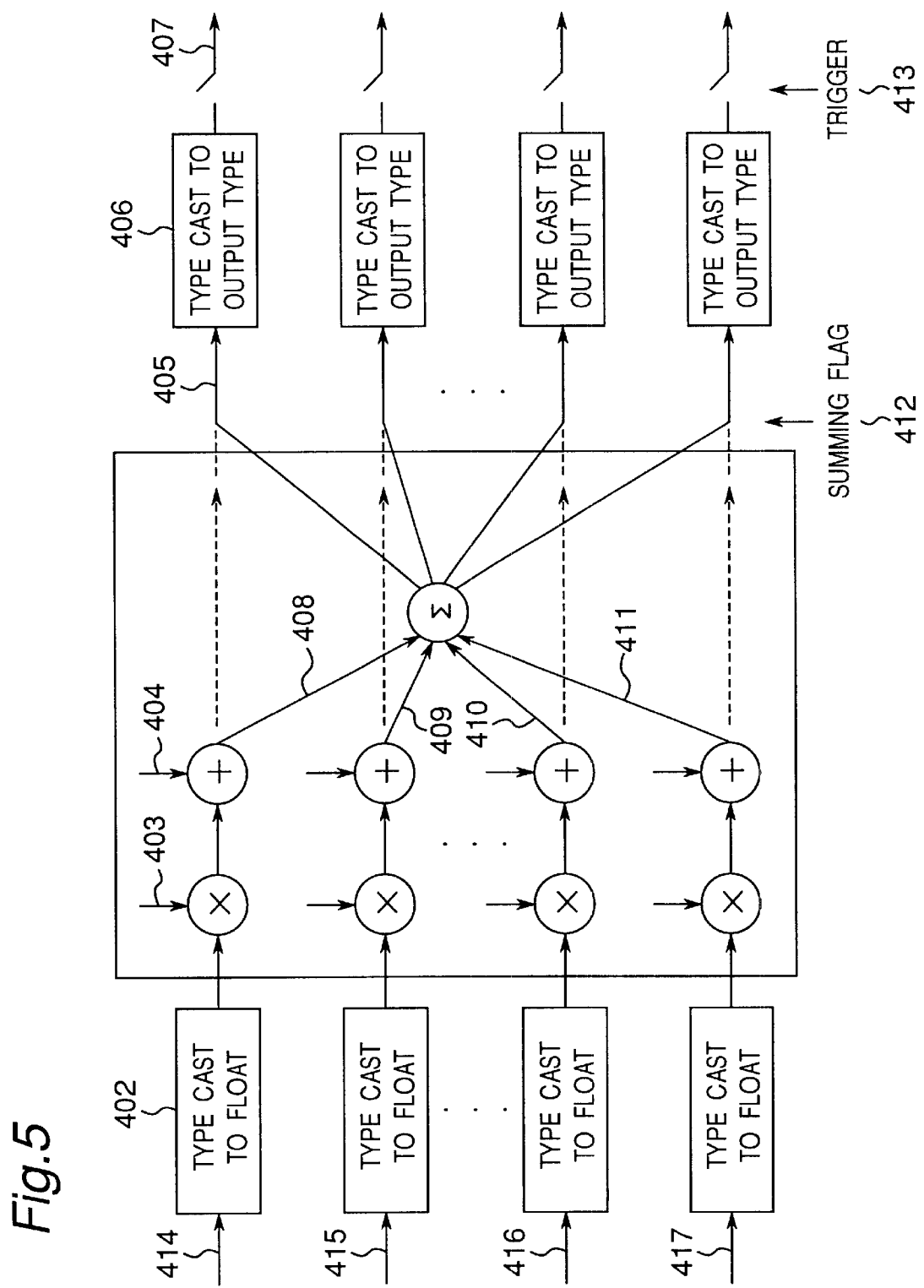
FIG. 5 is a block diagram showing the detailed operation of the valuator node according to the present invention.

FIG. 5 illustrates how incoming values are modified to produce the output values. The number of incoming values depends on the incoming data type. For example, data of the type SFFloat only has a single value while data of the type SFRotation has up to four values. Each incoming value (401) will be put into the mathematical operations as described in equation (1) and illustrated in FIG. 5.

Firstly, the incoming value is type cast into the equivalent floating point value (402). It is then multiplied by Factor1, a user pre-defined value (403) and added to Offset1, another user pre-defined value (404), both of which are floating point numbers. The output value (405) is then determined depending on whether the summing flag (412) is set. If the summing flag is set, all values (408, 409, 410, 411) will be summed and presented at the output. The output value (405) is then type cast (406) to the output data type to obtain the final output value (407). The final output value will be sent only it is triggered (413).

The steps described in the previous paragraph are similarly performed on the other available input values (414, 415, 416).

The proposed semantic table for the valuator node is as follows:

| Valuator { | | | |
|---|---|---|---|
| eventIn | SFBool | inSFBool | NULL |
| eventIn | SFColor | inSFColor | NULL |
| eventIn | MFColor | inMFColor | NULL |
| eventIn | SFFloat | inSFFloat | NULL |
| eventIn | MFFloat | inMFFloat | NULL |
| eventIn | SFInt32 | inSFInt32 | NULL |
| eventIn | MFInt32 | inMFInt32 | NULL |

-continued

| | | | |
|---|---|---|---|
| eventIn | SFRotation | inSFRotation | NULL |
| eventIn | MFRotation | inMFRotation | NULL |
| eventIn | SFString | inSFString | NULL |
| eventIn | MFString | inMFString | NULL |
| eventIn | SFTime | inSFTime | NULL |
| eventIn | SFVec2f | inSFVec2f | NULL |
| eventIn | MFVec2f | inMFVec2f | NULL |
| eventIn | SFVec3f | inSFVec3f | NULL |
| eventIn | MFVec3f | inMFVec3f | NULL |
| eventOut | SFBool | outSFBool | FALSE |
| eventOut | SFColor | outSFColor | 0, 0, 0 |
| eventOut | MFColor | outMFColor | NULL |
| eventOut | SFFloat | outSFFloat | 0 |
| eventOut | MFFloat | outMFFloat | NULL |
| eventOut | SFInt32 | outSFInt32 | 0 |
| eventOut | MFInt32 | outMFInt32 | NULL |
| eventOut | SFRotation | outSFRotation | NULL |
| eventOut | MFRotation | outMFRotation | NULL |
| eventOut | SFString | outSFString | " " |
| eventOut | MFString | outMFString | NULL |
| eventOut | SFTime | outSFTime | 0 |
| eventOut | SFVec2f | outSFVec2f | 0, 0 |
| eventOut | MFVec2f | outMFVec2f | NULL |
| eventOut | SFVec3f | outSFVec3f | 0, 0, 0 |
| eventOut | MFVec3f | OutMFVec3f | NULL |
| exposedField | SFFloat | Factor1 | 1 |
| exposedField | SFFloat | Factor2 | 1 |
| exposedField | SFFloat | Factor3 | 1 |
| exposedField | SFFloat | Factor4 | 1 |
| exposedField | MFFloat | Offset1 | 0 |
| exposedField | SFFloat | Offset2 | 0 |
| exposedField | SFFloat | Offset3 | 0 |
| exposedField | SFFloat | Offset4 | 0 |
| exposedField | SFBool | Sum | FALSE |
| exposedField | SFBool | Trigger | FALSE |
| } | | | |

This enhancement to the valuator allows it to respond better to the dynamic environment in a scene. It also eliminates the need for more valuators to perform the same task of changing a particular field of a node (refer to example shown below).

EXAMPLE

Two State Button

This example shows the merit of making the output values a function of the input values. In the two-state button example cited in sub clause 9.5.1.2.11.2 of the MPEG-4 System Final Committee Draft [1]. If we wish to change an object according to the mouse click (a common method to provide the viewer with a clicking button). We might have the following structure.

```
DEF TS TouchSensor { }
DEF MySwitch Switch2D {
    WhichChoice 0
    choice [
        Shape {
            geometry Circle {
                radius 0.5
            }
        }
        Shape {
geometry Rectangle {
            size 0.5, 0.5
        }
    }
    ]
}
DEF VL Valuator {
    SFInt32Factor   1.0
```

-continued

```
    outSFInt32 0.0
}
```

ROUTE TS.IsClick TO VL.inSFBOOL
ROUTE VL.outSFInt32 TO MySwitch.WhichChoice
A value of input TRUE (1) will cause an output value of (1.0)*1.0+0.0=1 (32-bit integer)
A value of input FALSE (0) will cause an output value of (1.0)*0.0+0.0=0 (32-bit integer)

The above example changes the shape object between circle and rectangle according to the clicking action of the mouse with just one valuator. It is logical, intuitive and easy to use. This is in contrast with a constant output valuator where multiple valuators are required to achieve the same result.

Routing of values from a node to another is one of the fundamental operations of a BIFS scene. Without routes, there can be no interaction among nodes and the result is a static scene that cannot changed with time and does not allow interactivity with the environment.

This invention will allow MPEG4 BIFS scene to have a better way of routing values between fields of two nodes. The two values at the two ends of the route can be dependent and dynamic. This is in contrast to a fixed-value valuator as specified in the currently MPEG-4 System Committee Draft.

Without this invention, only trivial scenes can be created, as useful fields of different data types cannot be connected. Data type casting is not effective with the currently specified valuator because of the static nature of the valuator.

The present disclosure relates to subject matter contained in priority Japanese Patent Application No. HEI 10-287663, filed on Oct. 9, 1998, the contents of which are herein expressly incorporated by reference in its entirety.

What is claimed is:

1. A method for linking information of different data types in a representation of the spatial and temporal description of a scene where the spatial and temporal relationship of the objects in the scene are represented by a scene tree description comprising of a plurality of nodes which describe the properties of the object and routes which connect the fields of one node to another, by a valuator node comprising the steps of:
   setting the value of the input of the valuator node to the value of output of the source node;
   determining the data type of the output of the source node and the input of the destination node;
   selecting the operation and typecasting necessary from a set of predefined procedure based on the data type of said fields;
   modifying said input by said selected procedure to form the output of the valuator node;
   casting said output of the valuator node to the required data type of the input of the destination node; and
   setting the value of the input of the destination node to the value of the output of the valuator node.

2. A method of claim 1, wherein the input and output fields of the valuator comprises at least one of the following data types: integer number, floating point number and Boolean value.

3. A method of claim 1, wherein the method of modifying said input value by a predefined procedure to form the output value comprises the steps of multiplying the input field by a constant value followed by adding a second constant value to obtain the final value for the output field.

4. A method of claim 1, where the constants are user defined at the time of either one of content creation and during the execution of the content.

5. A method for linking information of different data types in a representation of the spatial and temporal description of a scene where the spatial and temporal relationship of the objects in the scene are represented by a scene tree description comprising of a plurality of nodes which describe the properties of the object and routes which connect the fields of one node to another, by a valuator node comprising the steps of:
   setting the value of the input vector of the valuator node to the value of the fields of output vector of the source node;
   determining the data type of the fields of the output vector of the source node and the input vector of the destination node;
   selecting the operation and typecasting necessary from a set of predefined procedure or function based on the data type of said fields;
   modifying said input vector by said selected procedure to form the output vector of the valuator node;
   casting said output vector of the valuator node to the required data type of the input vector of the destination node, and
   setting the value of the input vector of the destination node to the value of the output vector of the valuator node.

6. A method of claim 5, wherein the input and output vectors contain a plurality of elements and that the elements comprises at least one of the following data types: integer number, floating point number and Boolean value.

7. A method of claim 5, wherein the method of modifying said input vector by a predefined procedure to form the output vector comprises the steps of:
   multiplying each element of input vector by a constant value to obtained the scaled value; and
   adding a second constant value to the scaled value to obtain the offset value; and
   setting each element of the output vector to the corresponding offset value.

8. A method of claim 7, wherein the valuator node comprises an additional input field to control the choice of selecting the output vector.

9. A method of claim 7, wherein the valuator node comprises an additional input field and that the setting of each element of the output vector to the corresponding offset value is enabled when a control signal is received by said input fieldsaid.

10. A method of claim 7, wherein the valuator node comprises an additional input field and that the setting of each element of the output vector to said sum is enabled when a control signal is received by said input fieldsaid.

11. A method of claim 5, wherein the method of modifying said input vector by a predefined procedure to form the output vector comprises the steps of:
   multiplying each element of input vector by a constant value to obtained the scaled value;
   adding a second constant value to the scaled value to obtain the offset value;
   summing all the offset values derived from the input vector to form; and
   setting each element of the output vector to said sum.

12. A method of claim 7, wherein the valuator node comprises an additional input field to control the choice of selecting the output vector.

* * * * *

UNITED STATES PATENT AND TRADEMARK OFFICE
CERTIFICATE OF CORRECTION

PATENT NO. : 6,381,273 B1
DATED : April 30, 2002
INVENTOR(S) : C.Y. Law et al.

It is certified that error appears in the above-identified patent and that said Letters Patent is hereby corrected as shown below:

Column 8,
Line 63, "claim 7" should be -- claim 11 --.

Signed and Sealed this

Seventeenth Day of September, 2002

*Attest:*

*Attesting Officer*

JAMES E. ROGAN
*Director of the United States Patent and Trademark Office*